United States Patent
Dezert et al.

(10) Patent No.: US 8,795,794 B2
(45) Date of Patent: Aug. 5, 2014

(54) METHOD AND DEVICE FOR MANUFACTURING A DOWN HOLE MOTOR RADIAL BEARING

(75) Inventors: Didier Dezert, Chapeiry (FR); Guy Maybon, Doussard (FR)

(73) Assignee: Technogenia, Saint Jorioz (FR)

( * ) Notice: Subject to any disclaimer, the term of this patent is extended or adjusted under 35 U.S.C. 154(b) by 520 days.

(21) Appl. No.: 12/811,548

(22) PCT Filed: Feb. 8, 2008

(86) PCT No.: PCT/IB2008/051776
§ 371 (c)(1),
(2), (4) Date: Jul. 2, 2010

(87) PCT Pub. No.: WO2009/098549
PCT Pub. Date: Aug. 13, 2009

(65) Prior Publication Data
US 2010/0288559 A1   Nov. 18, 2010

(51) Int. Cl.
*C23C 14/30* (2006.01)
*C23C 14/14* (2006.01)
*B21D 53/10* (2006.01)
*F16C 33/02* (2006.01)

(52) U.S. Cl.
USPC ......... 427/596; 427/597; 29/898.04; 384/276

(58) Field of Classification Search
None
See application file for complete search history.

(56) References Cited

U.S. PATENT DOCUMENTS

| | | | |
|---|---|---|---|
| 4,764,036 A * | 8/1988 | McPherson | 384/276 |
| 4,819,517 A * | 4/1989 | Vezirian | 76/108.2 |
| 5,458,460 A | 10/1995 | Okada | |
| 6,309,762 B1 | 10/2001 | Speckert | |
| 6,881,451 B2 * | 4/2005 | Heinemann et al. | 427/554 |
| 2002/0017507 A1 * | 2/2002 | North | 219/121.45 |
| 2006/0283017 A1 * | 12/2006 | von Gynz-Rekowski | 29/898.04 |
| 2007/0154738 A1 * | 7/2007 | Ganguly et al. | 428/698 |

FOREIGN PATENT DOCUMENTS

WO   2007/001826 A2   1/2007

* cited by examiner

Primary Examiner — Timothy Meeks
Assistant Examiner — Ina Agaj
(74) Attorney, Agent, or Firm — William H. Eilberg

(57) ABSTRACT

The present invention concerns the down hole motors used in the oil prospecting industry to drive drill bits for drilling the ground at great depths. The down hole motor (1) comprises a drive shaft (5) held in the motor body (3) by an axial thrust bearing (6) and by a radial bearing (7). The radial bearing (7) is a tubular member whose interior surface is coated with an anti-abrasion layer (11) formed by laser-assisted facing directly inside an alloy steel radial bearing body (10). The thickness of the facing layer is then reduced by removing material by means of a cutting tool.
This produces a radial bearing (7) that is relatively insensitive to drilling mud and confers great reliability on the down hole motor (1).

9 Claims, 6 Drawing Sheets

METHOD AND DEVICE FOR MANUFACTURING A DOWN HOLE MOTOR RADIAL BEARING

TECHNICAL FIELD OF THE INVENTION

The present invention concerns the down hole motors used in the oil prospecting industry to drive drill bits for drilling the ground at great depths.

In oil prospecting, to recover oil or gas, it is necessary to drill holes to great depths. A down hole motor is used for this, fixed to the lower end of a drillstring, and driving a drill bit in axial rotation. The down hole motor comprises a shaft engaged for axial rotation in a motor body and carrying the drill bit at its end. The shaft is held in the motor body by sliding bearings, in particular a radial bearing.

There are two types of equipment for down hole motors: turbines and motors as such. These two types of equipment necessitate, for their construction, smooth bearings including high-performance anti-abrasion coatings.

In both cases, the motors are driven by the drilling mud injected to bring up the cuttings. It is this mixture of cuttings and drilling mud that subjects this equipment to particularly severe abrasion.

The bearings necessary for the rotation of these turbines and motors must satisfy precise specifications that relate in particular to geometrical tolerances and to the quality of the steels used.

Bearings have already been manufactured in which the rubbing surfaces are of anti-abrasion materials based on grains of tungsten carbide buried in a hard metal matrix.

Thus the document WO 2007/001826 proposes a method for manufacturing radial bearings for down hole motors in which a tubular metal bush is used, a hard facing material is applied to its exterior surface by means of a laser, the material being based on grains of anti-abrasion material buried in a metal matrix. A steel external layer is then applied around the layer of anti-abrasion material by laser-assisted facing. The outside diameter is machined to remove only a portion of the metal outside layer. The inside diameter is machined to remove all of the initial tubular metal bush and to expose the inside face of the hard facing material of the intermediate layer.

This method enables a hard anti-abrasion material interior layer to be produced by laser-assisted facing.

However, this method is time-consuming and costly because it necessitates the production of several layers by means of a laser and necessitates a plurality of machining operations in which a relatively thick layer of material must be removed. Furthermore, the exterior metal body, produced by laser-assisted facing, cannot produce a bearing body having a very high mechanical strength. Now a high mechanical strength of the bearing body is beneficial for withstanding the particular mechanical stresses and the violent shocks to which the down hole motor is subjected in use.

As an alternative, it has also been proposed to produce, directly inside a high-strength tubular metal body, an interior facing layer by infiltration of a matrix of copper and manganese alloy into a layer of hard anti-abrasion material powder. However, the matrix then has a hardness lower than could be produced by laser-assisted facing, a process in which nickel-based alloys can be used.

As an alternative, it has further been proposed to produce the radial bearing in a number of parts assembled radially together by welding. However, there is always a risk of mechanical strength problems because of the welding, and there is a risk of defective homogeneity of the structure obtained in this way, as a function of the angular orientation considered around the axis of the motor.

Bearings produced by these methods do not allow heat treatment of the steel, in particular of the female portion of the bearing body, to increase its hardness. The risk of separation of the coating, in particular following dimensional changes caused by quenching intended to harden the bearing body, make the operation risk and lead to a lack of reliability.

These known methods are not satisfactory, in that the conditions of use of down hole motors are very severe: high temperature, presence of abrasive drilling mud, presence of shock loads.

Furthermore, known methods do not provide for bearings to be repaired when worn.

Now radial bearings must be changed as soon as play appears that exceeds the normal clearance by 1 to 2 hundredths of a millimeter, as there is then a risk of excessive penetration of the drilling mud, which causes very fast wear of the bearing.

With the known techniques, it is then necessary purely and simply to replace the bearing, which can no longer be reused or recycled.

SUMMARY OF THE INVENTION

The invention aims to provide a method of manufacturing a down hole motor radial bearing that has improved properties in terms of both mechanical strength and durability.

The invention also aims to provide a method of this kind which not only produces new down hole motor radial bearings but also can be used to repair or to refurbish worn down hole motor bearings.

The invention aims further to provide a method of the above kind that is of relatively low cost and in particular does not necessitate a multiplicity of time-consuming and costly operations of machining anti-abrasion material surfaces.

To achieve the above and other aims, the invention proposes a method for manufacturing a down hole motor radial bearing with an anti-abrasion interior surface, said radial bearing having a tubular metal radial bearing body having a fixing surface for fixing it into a down hole motor body and having an anti-abrasion interior layer based on grains of anti-abrasion material buried in a metal matrix, the method comprising the following steps:

a) providing and holding a tubular radial bearing body having an initial interior surface, b) applying an anti-abrasion material layer directly to the initial interior surface of the tubular radial bearing body by laser-assisted facing, c) after cooling, machining the anti-abrasion material layer to produce the anti-abrasion interior layer having a final cylindrical interior surface having an appropriate inside diameter.

Thanks to the direct laser-assisted facing of the interior surface of the tubular radial bearing body, a preformed tubular metal bearing body can be used having excellent mechanical properties and facing does not affect the properties of the metal portion of the tubular body by exaggerated heating.

At the same time, laser-assisted facing enables the use of hard matrices such as a nickel-based alloy so that the anti-abrasion properties of the active surface of the bearing are improved at the same time.

In practice, during the step b), a laser beam is produced by a laser source, the laser beam is directed into the central passage of the radial bearing body as far as a facing area of the initial interior surface, there is simultaneously sprayed onto the facing area a mixture of anti-abrasion material grains and metal powder, and the facing area is moved progressively in the radial bearing body to produce an anti-abrasion material layer of substantially uniform thickness on the initial interior surface.

Clearly such facing ensures satisfactory homogeneity throughout the interior anti-abrasion layer of the bearing. The interior layer obtained in this way is not sufficiently uniform in thickness, however, and subsequent finishing steps are provided.

At the end of the step b), the anti-abrasion material layer produced by a laser-assisted facing process has advantageously a thickness of about 1 mm, which enables subsequently, during machining, the removal of only a portion of the thickness of this anti-abrasion material layer, and, at the end of the step c), the final anti-abrasion material layer can advantageously have a thickness of about 0.75 mm.

This is sufficient to produce an anti-abrasion material layer of constant thickness and good homogeneity, with an interior surface having a constant diameter.

At the end of machining, the final interior surface can advantageously have a surface state whose roughness parameter Ra is less than or equal to 0.4 μm.

The method applies as much to the production of new bearings as to the repair of worn bearings.

Thus, in a first application, during the step a), the tubular metal radial bearing body has no anti-abrasion interior layer; in this case, during the step b), the anti-abrasion material layer is applied directly to the metal portion of the tubular radial bearing body.

In the second case, during step a), the tubular metal radial bearing body comprises an anti-abrasion interior layer to be repaired. In this case, during the step b), the anti-abrasion material layer is applied to the anti-abrasion interior layer to be repaired.

Another aspect of the invention proposes a down hole motor radial bearing with an anti-abrasion interior surface, comprising:

a tubular radial bearing body of steel of high mechanical strength such as a heat-treated alloy steel, for example an AFNOR standard 42CD4 type alloy steel or an AISI standard 4140 type alloy steel, an anti-abrasion interior layer based on anti-abrasion material grains chosen in the group comprising tungsten carbide and titanium carbide, the anti-abrasion material grains being buried in a nickel alloy matrix, the interior surface being a circular cylinder, with a surface state whose roughness parameter is less than or equal to 0.4 μm.

Another aspect of the invention proposes a down hole motor comprising:

a motor body with an axial passage in which is fixed a radial bearing as defined hereinabove, a drive shaft adapted to carry a drill bit and having a cylindrical section engaged with a small clearance in the radial bearing, said cylindrical section also having an anti-abrasion external layer based on anti-abrasion material grains buried in a nickel alloy matrix.

BRIEF DESCRIPTION OF THE DRAWINGS

Other aims, features and advantages of the present invention will emerge from the following description of particular embodiments, given with reference to the appended figures, in which.

DESCRIPTION OF PREFERRED EMBODIMENTS

Figure 1:
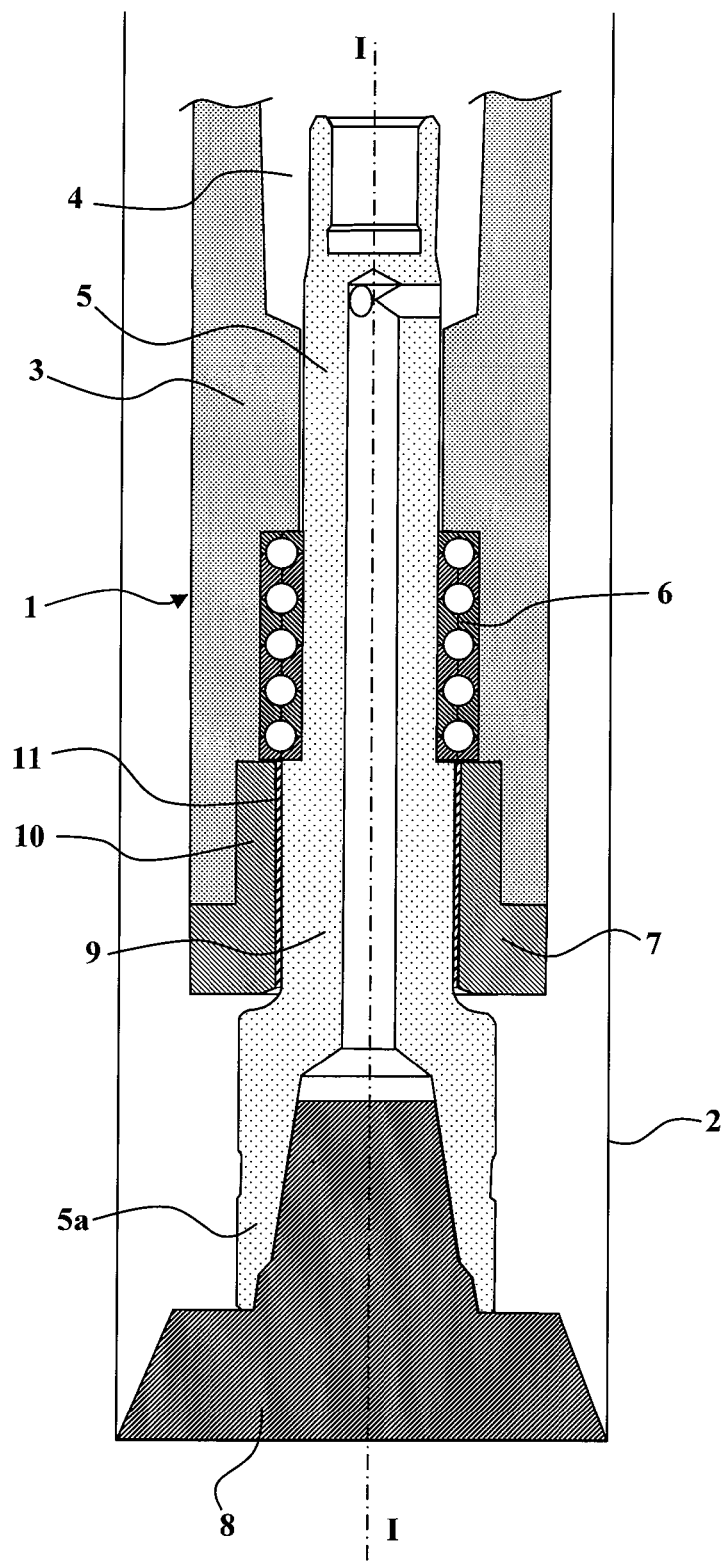
FIG. 1 is a diagrammatic view in longitudinal section of a down hole motor for the oil prospecting industry.

Consider first FIG. 1, which is a diagrammatic view in longitudinal section of a down hole motor like those used in oil prospecting.

The down hole motor, generally designated by the reference 1, is placed at the end of a generally vertical drillstring, and is therefore located at the bottom of a drill hole 2. It generally comprises a tubular motor body 3 with an axial passage 4 and a drive shaft 5 rotatably mounted in the motor body 3. The drive shaft 5 is guided in the motor body 3 on the one hand by an axial thrust bearing 6 adapted to absorb forces in the axial direction, in particular for pushing the drive shaft 5 downward, and by a radial bearing 7 adapted to guide the drive shaft 5 radially in the motor body 3.

The free end 5a of the drive shaft 5 extends out of the motor body 3 and is adapted to carry a drill bit 8 which, by virtue of the rotation of the drive shaft 5, produces the drill hole 2.

The down hole motor 1 is driven in rotation by pressurized drilling mud injected from the surface through the axial passage 4, which drilling mud is fed to the drill bit 8 to extract the cuttings. The mixture of cuttings and drilling mud rises to the surface around the motor body 3 in the drill hole 2.

In operation, the drive shaft 5 turns at a speed of about 100 to 300 revolutions per minute.

Because of its position very far away from the operators, deep at the bottom of the drill hole 2, the down hole motor 1 must be highly reliable to prevent the risk of jamming.

For this, the drive shaft 5 must be guided with great reliability, especially by the radial bearing 7.

The drilling mud must also be prevented from penetrating into the clearance between the radial bearing and a corresponding radial guide section 9 of the rotary shaft 5.

For this purpose, a radial bearing 7 is produced whose dimensions are particularly precise so that the clearance between the radial bearing 7 and the radial guide section 9 is sufficiently small to oppose the penetration of abrasive particles contained in the drilling mud.

As soon as a clearance exceeding the normal clearance by 1 to 2 hundredths of a millimeter appears, the radial bearing 7 must be changed, which is a time-consuming and complex maintenance operation, necessitating the extraction and dismantling of the entire drillstring.

For this purpose the invention provides a radial bearing 7 and a radial guide section 9 whose surfaces have good anti-abrasion properties, provided by anti-abrasion materials that are particularly strong to oppose any abrasive effect of the drilling mud, the bearing body itself being of a material having good mechanical strength properties.

In practice, given that the radial bearing 7 is a part subject to wear that must be changed or refurbished periodically, there can advantageously be provided, as shown in FIG. 1, a radial bearing 7 fastened into the motor body 3. The radial bearing 7 is therefore a tubular part in the form of a bush whose interior surface forms the guiding surface of the radial bearing 7 and whose exterior surface is conformed to fit into the motor body 3.

Figure 2:
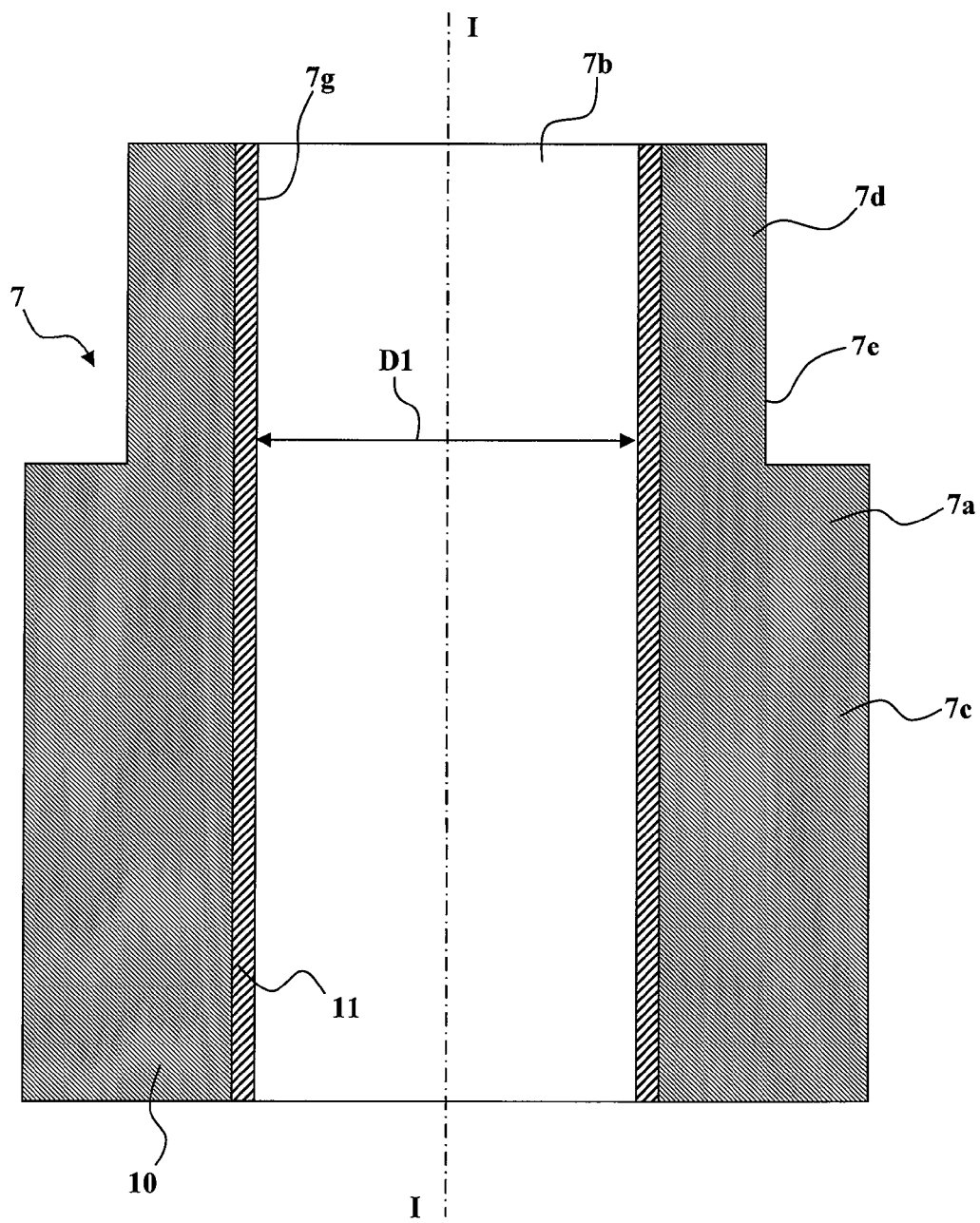
FIG. 2 is a detail view in longitudinal section of one embodiment of a down hole motor radial bearing of the present invention.

Consider now FIG. 2, which shows to a larger scale an attached part of this kind forming the radial bearing 7.

The part 7 forming the radial bearing is therefore a tubular part, having a peripheral wall 7a surrounding an axial through-passage 7b. The peripheral wall 7a comprises a thicker distal section 7c and a thinner proximal section 7d, the two being concentric and having a continuous axial passage 7b of constant diameter.

Thus the outside diameter of the proximal section 7d is smaller than the outside diameter of the distal section 7c so as to fit into one tubular end of the motor body 3 as shown in FIG. 1.

The outside surface 7e of the proximal section 7d therefore constitutes an outside surface to be fixed into the motor body 3.

The peripheral wall 7a includes a cylindrical interior surface 7g whose inside diameter D1 is perfectly adapted to receive with a small functional clearance the radial guide section 9 of the drive shaft 5 (FIG. 1). As seen in FIG. 2, in longitudinal section, the radial bearing 7 of the down hole motor in reality comprises a tubular radial bearing body 10, essentially of steel with high mechanical strength, such as a heat-treated alloy steel, and an anti-abrasion interior layer 11 forming the interior surface 7g. To obtain satisfactory mechanical strength, the bearing body 10 can advantageously be of carbon steel suitable for quenching containing chromium and molybdenum, for example 42CD4 steel according to the AFNOR French standard or AISI 4140 steel according to the international standard.

The bearing body 10 can be made entirely of steel. However, in certain applications, the bearing body 10 can be partly of steel and partly of other materials, steel forming the metal base receiving the anti-abrasion interior layer 11.

The anti-abrasion interior layer 11 is based on grains of anti-abrasion material buried in a metal matrix.

Figure 3:
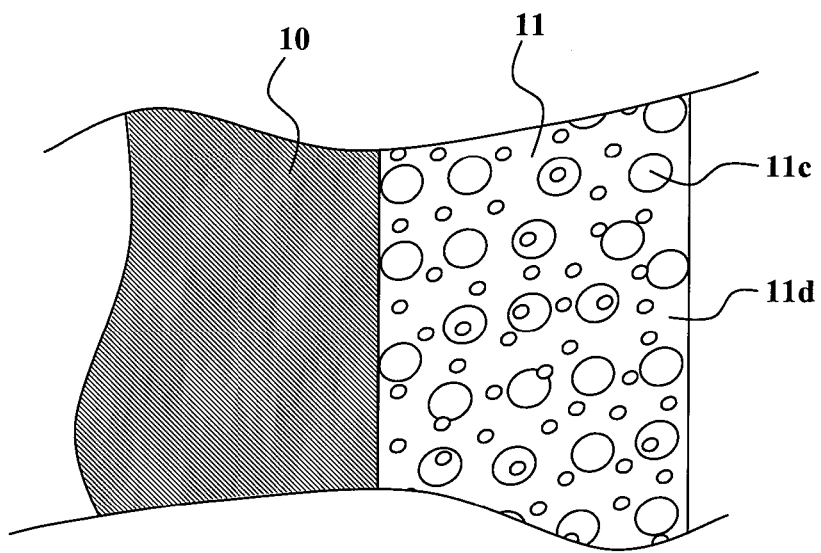
FIG. 3 is a detail view to a larger scale showing the structure of the anti-abrasion layer of the FIG. 2 radial bearing.

FIG. 3 shows the structure of the anti-abrasion layer 11 to a larger scale: the grains 11c of anti-abrasion material are buried in the metal matrix 11d.

The anti-abrasion material of the grains 11c is preferably chosen in the group consisting of tungsten carbide and titanium carbide.

At the same time, the metal matrix 11d advantageously consists of a nickel alloy having a high hardness.

For correct guidance of the drive shaft 5 and to reduce the risk of abrasion by the drilling mud, the interior surface 7g is a circular cylinder with a surface state whose roughness parameter Ra is less than or equal to 0.4 µm.

To manufacture this kind of down hole motor radial bearing 7, it is advantageous to use a method producing an anti-abrasion layer 11 that is particularly homogeneous and mechanically strong, perfectly attached to the radial bearing body 10.

At the same time, because of the great hardness of the anti-abrasion material, machining operations must be avoided as much as possible, as they lead to rapid wear of the machining tools through removal of material.

The invention uses a laser-assisted facing process inside the tubular part forming the radial bearing body 10.

Figure 4:
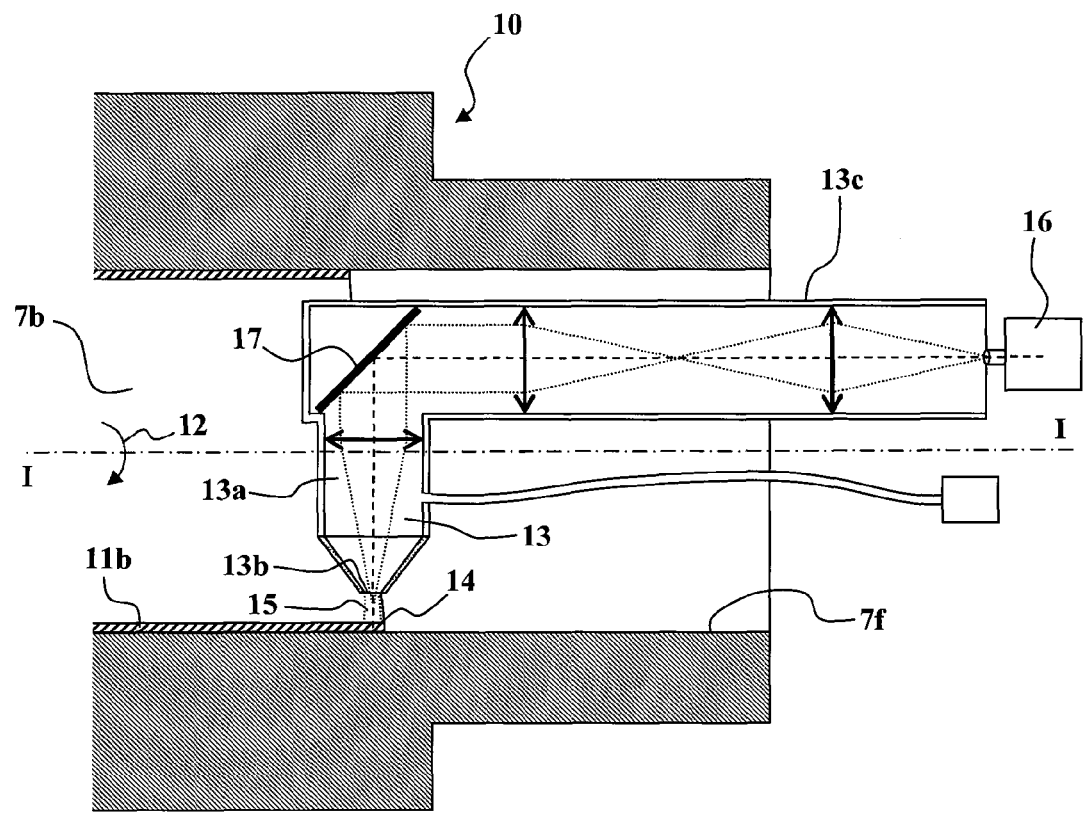
FIG. 4 is a diagrammatic side view illustrating the step of laser-assisted facing with an anti-abrasion material to produce the FIG. 2 radial bearing, starting with a tubular metal body.

FIG. 4 shows the device used for implementing this method.

In this device, a radial bearing body 10 is placed in a horizontal position, i.e. with its longitudinal axis I-I oriented horizontally, the radial bearing body 10 being held by a rotary spindle (not shown) that can drive it in rotation about its axis I-I as shown by the arrow 12.

In the embodiment shown in FIG. 4, the radial bearing body 10 is an alloy steel body that has undergone heat treatment to harden it, like that shown in FIG. 2.

The device further comprises a facing head 13 with dimensions such that it can penetrate into the axial passage 7b of the radial bearing body 10 and adapted to spray onto a facing area 14 of the interior surface 7f of the radial bearing body 10 a mixture of metal matrix alloy powder and anti-abrasion material grains, in a radial jet 15, at the same time as a radial laser beam impinges on the facing area 14.

In practice, the facing head 13 includes a radial conduit 13a with a powder sprayer nozzle in which the powder moves in a cyclone toward the outlet 13b. The facing head 13 is mounted at the end of an axial tube 13c the upstream end of which remains outside the radial bearing body 10. A laser source 16, for example a laser diode, or a $CO_2$ laser, or a YAG laser, or a fiber laser, produces a laser beam that propagates axially in the axial tube 13c and is deflected by a mirror 17 in the radial direction toward the outlet 13b of the facing head 13. An optical system guides the laser beam in the axial tube 13c and in the facing head 13 to focus it onto the facing area 14.

The assembly formed by the facing head 13 and the laser source 16 can be moved axially along the axis I-I so that the facing area 14 can be moved with a helicoidal movement over all of the interior surface 7f of the radial bearing body 10 through a combination of the axial movement of the facing head 13 and the circular movement of the radial bearing body 10 about the axis I-I.

In the embodiment shown in FIG. 4, the radial bearing body 10 initially has no anti-abrasion material layer and the facing operation produces the whole of the anti-abrasion layer 11.

Thus by using the device shown in FIG. 4 to produce a down hole motor radial bearing with an anti-abrasion interior surface 7f, the exterior surface of the tubular radial bearing body 10 is held by a rotary spindle rotating about the horizontal axis I-I, the radial bearing body 10 having a cylindrical interior surface 7f. An anti-abrasion material layer 11 is applied directly to the interior surface 7f of the tubular radial bearing body 10 by laser-assisted facing by means of the facing nozzle 13. The layer is applied progressively by axial movement of the facing nozzle 13 and by rotation about the axis I-I of the radial bearing body 10 so that the facing area 14 occupies successively all the portions of the interior surface 7f of the radial bearing body 10.

After cooling, the anti-abrasion material layer is machined to produce a final cylindrical interior surface 7g having an appropriate diameter D1.

Figure 6:
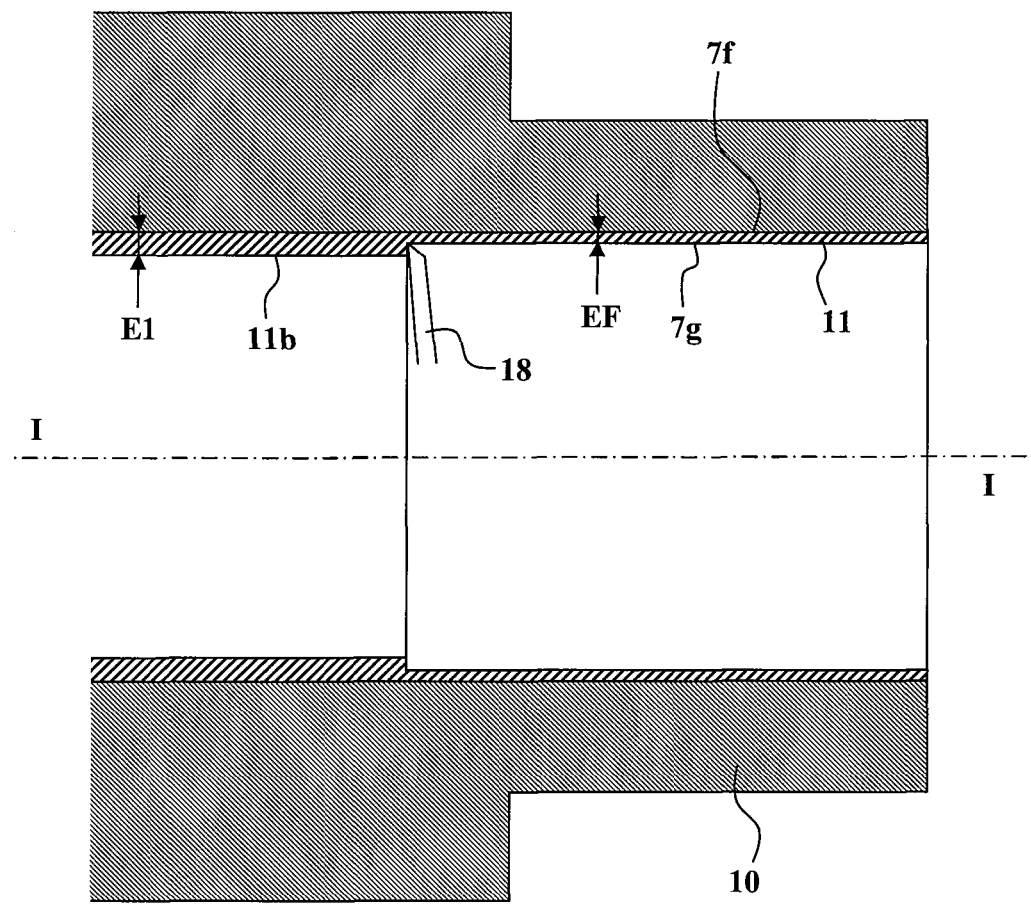
FIG. 6 is a diagrammatic side view in longitudinal section illustrating the machining step for finishing the FIG. 2 radial bearing.

FIG. 6 shows the machining step, using a grinding tool or other tool 18 for removing material that is moved progressively in the axial direction I-I while the radial bearing body 10 is turned about the axis I-I. Starting from an anti-abrasion material layer 11b having an initial thickness E1 of about 1 mm, by removing material by means of the tool 18 there is obtained an anti-abrasion layer 11 having a final thickness EF of about 0.75 mm, the final interior surface 7g of which is perfectly cylindrical and coaxial and has a roughness parameter Ra that is preferably less than or equal to 0.4 µm.

Figure 5:
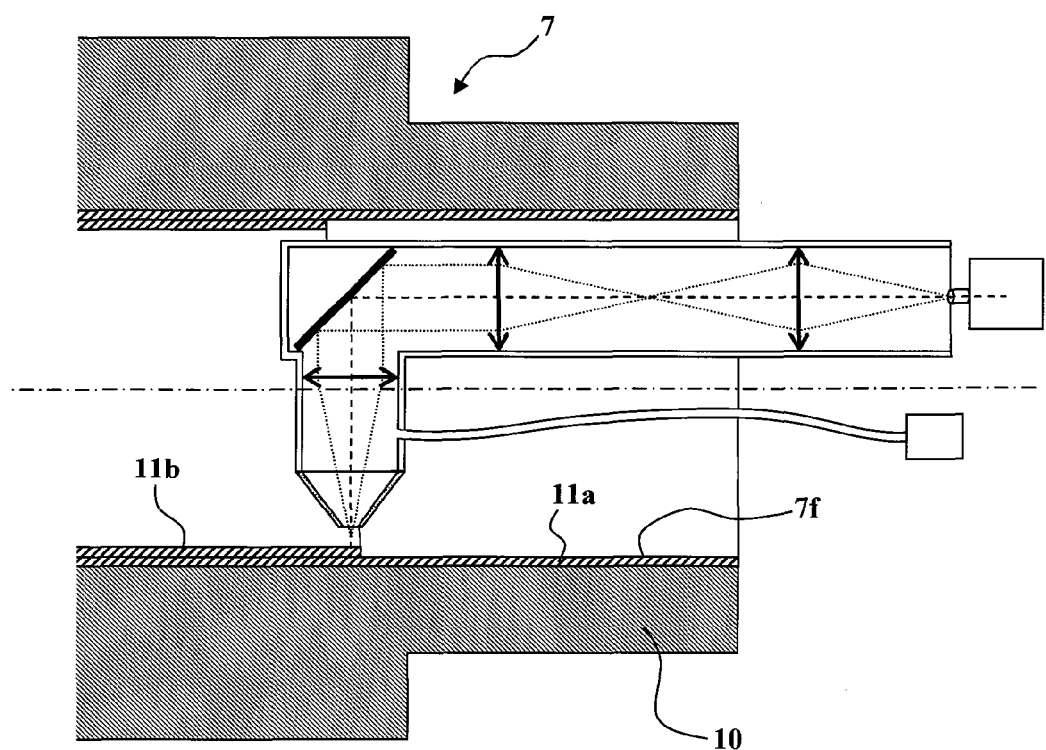
FIG. 5 illustrates diagrammatically, in side view and in section, a step of facing a worn radial bearing to refurbish a FIG. 2 radial bearing.

Consider now FIG. 5, which shows the process of facing a radial bearing 7 to be reconditioned, to re-establish the exact shape of the interior surface 7g (FIG. 2). In this case, the same means are used as in FIG. 4, and those means are identified by the same reference numbers.

The only difference is that, in this situation, what is faced is a radial bearing body 10 already provided with an interior layer 11a of anti-abrasion material, for example a layer that has been deformed by wear of the radial bearing 7 in use.

According to the invention, the facing is effected by depositing a layer 11b on the surface 7f of a layer 11a to be repaired. The subsequent machining step shown in FIG. 6 is the same as before.

Depending on what is required, for example to compensate heavy wear of the radial bearing 7, or to provide a thicker anti-abrasion material layer 11, a multilayer deposit can be formed in a number of successive passes of the facing nozzle 13 over the interior surface of the radial bearing body 10. After application of the last anti-abrasion material layer, the machining step is carried out to remove material, for example to a thickness of about 0.25 mm.

The present invention is not limited to the embodiments that have been explicitly described, but includes variants and generalizations thereof within the scope of the following claims.

The invention claimed is:

1. Method for manufacturing a down hole motor radial bearing with an anti-abrasion interior surface, said radial bearing having a tubular metal radial bearing body having a fixing surface for fixing it into a down hole motor body and having an anti-abrasion interior layer based on grains of anti-abrasion material buried in a metal matrix, the interior surface of the radial bearing being engaged around at least a portion of a drive shaft of the down hole motor, such that the drive shaft is free to rotate relative to the radial bearing, the method comprising the following steps:
  a) providing and holding said tubular radial bearing body having an initial interior surface which is free of grooves,
  b) applying an anti-abrasion material layer directly to the initial interior surface of the tubular radial bearing body by laser-assisted facing, wherein a laser beam is produced by a laser source, the laser beam is directed into a central passage of the radial bearing body as far as a facing area of the initial interior surface, there is simultaneously sprayed onto the facing area a mixture of anti-abrasion material grains and metal powder,
  c) after cooling, machining the anti-abrasion material layer to produce the anti-abrasion interior layer having a final cylindrical interior surface having an inside diameter which is sufficiently large to allow rotation of the drive shaft within the radial bearing, and which is sufficiently small to oppose penetration of abrasive particles contained in a drilling mud,
  wherein step b) is the only applying step before the machining step c).

2. Method according to claim 1, wherein, during the step b), the facing area is moved progressively in the radial bearing body to produce an anti-abrasion material layer of substantially uniform thickness on the initial interior surface.

3. Method according to claim 1, wherein, at the end of the step b), the anti-abrasion material layer produced by a laser-assisted facing process has a thickness of about 1 mm.

4. Method according to claim 3, wherein, at the end of the step c), the anti-abrasion material layer has a thickness of about 0.75 mm.

5. Method according to claim 4, wherein, at the end of machining, the final interior surface has a surface state whose roughness parameter is less than or equal to 0.4 μm.

6. Method according to claim 1, wherein:
  during the step a), the tubular metal radial bearing body has no anti-abrasion interior layer,
  during the step b), the anti-abrasion material layer is applied directly to the metal portion of the tubular radial bearing body.

7. Method according to claim 1, wherein:
  during step a), the tubular metal radial bearing body comprises an anti-abrasion interior layer to be repaired,
  during the step b), the anti-abrasion material layer is applied to an anti-abrasion interior layer to be repaired.

8. Method according to claim 1, wherein the tubular radial bearing body is essentially of a heat treated alloy steel of high mechanical strength.

9. Method according to claim 1, wherein:
  the anti-abrasion material grains are selected from the group consisting of tungsten carbide and titanium carbide, the metal matrix is of nickel alloy.

* * * * *